(12) United States Patent  (10) Patent No.: US 8,787,871 B2
Givens et al.  (45) Date of Patent: Jul. 22, 2014

(54) SYSTEM AND METHOD FOR CALCULATING AND DISSEMINATING INTELLIGENT EVACUATION ROUTES BASED ON LOCATION AWARENESS AND INTEGRATED ANALYTICS

(75) Inventors: Charlet Givens, Dallas, TX (US); Shiju Mathai, Carrollton, TX (US); Hung Tack Kwan, Grand Prairie, TX (US); Romelia Flores, Keller, TX (US)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 12/326,686

(22) Filed: Dec. 2, 2008

(65) Prior Publication Data

US 2010/0136945 A1  Jun. 3, 2010

(51) Int. Cl.
*H04M 11/04* (2006.01)

(52) U.S. Cl.
USPC ............... 455/404.2; 455/404.1; 455/414.1; 455/414.2; 370/438

(58) Field of Classification Search
CPC ....................................... H04W 4/22
USPC ............ 455/404.1, 404.2, 414.1, 414.2; 370/438, 539.28, 573.1, 825.49, 905, 370/995.1

See application file for complete search history.

(56) References Cited

U.S. PATENT DOCUMENTS

| | | | |
|---|---|---|---|
| 5,926,103 A * | 7/1999 | Petite | 340/8.1 |
| 7,113,107 B2 | 9/2006 | Taylor | |
| 7,376,433 B1 | 5/2008 | Hose | |
| 7,595,738 B2 * | 9/2009 | Krock et al. | 340/905 |
| 7,602,277 B1 * | 10/2009 | Daly et al. | 340/438 |
| 2004/0110515 A1 | 6/2004 | Blumberg et al. | |
| 2004/0201470 A1 | 10/2004 | Reed | |
| 2005/0209770 A1 | 9/2005 | O'Neill et al. | |
| 2005/0272368 A1 | 12/2005 | Langsenkamp et al. | |
| 2005/0272412 A1 | 12/2005 | Langsenkamp et al. | |
| 2006/0025106 A1 * | 2/2006 | Byers et al. | 455/404.2 |
| 2006/0265489 A1 | 11/2006 | Moore | |
| 2007/0040895 A1 | 2/2007 | Barbeau et al. | |
| 2007/0072583 A1 * | 3/2007 | Barbeau et al. | 455/404.2 |
| 2007/0156331 A1 * | 7/2007 | Terada et al. | 701/208 |
| 2007/0210910 A1 | 9/2007 | Norstrom et al. | |
| 2010/0291907 A1 * | 11/2010 | MacNaughtan et al. | 455/414.1 |
| 2011/0022304 A1 * | 1/2011 | Lee | 701/201 |

* cited by examiner

*Primary Examiner* — Amancio Gonzalez
(74) *Attorney, Agent, or Firm* — Novak Druce Connolly Bove + Quigg LLP (57) ABSTRACT

A system for providing emergency-related information. The system can include a processor configured to execute computer-readable instructions. The system can also include one or more communications devices utilized by a user, wherein the one or more communications devices is communicatively linked with a provider. Additionally, the system can include a personalized notification route engine (PNRE) configured to execute on the processor and communicatively linked with the provider. The PNRE can be configured to receive geospatial information associated with the one or more communications devices via the provider. Also, the PNRE can be configured to obtain data comprising one or more among evacuation routes, evacuation rules, demographic data, environmental conditions, external alerts, real-time traffic data, and traffic control data. The PNRE can further be configured to determine the emergency-related information based on the geospatial information and the obtained data and transmit the determined emergency-related information to the user via the provider.

42 Claims, 4 Drawing Sheets

FIG. 4

SYSTEM AND METHOD FOR CALCULATING AND DISSEMINATING INTELLIGENT EVACUATION ROUTES BASED ON LOCATION AWARENESS AND INTEGRATED ANALYTICS

FIELD OF THE INVENTION

The present invention is related to the fields of data processing and analysis for emergency-related events, and more particularly, to providing emergency-related information to emergency personnel and other individuals in need of assistance.

BACKGROUND OF THE INVENTION

During emergency situations it is often difficult for people involved to remain calm, react in an appropriate manner, and ensure a safe evacuation to another location. While it is important for individuals involved in an emergency situation to be able to leave an emergency area, it is just as important for emergency personnel to be able to enter into the emergency area in a quick and safe fashion so that they can assist those in need. It is typically quite difficult to determine the most expedient manner in which to evacuate the area or, for emergency personnel, to mobilize into the area. Moreover, many involved in such situations do not have any access to critical information such as anticipated traffic patterns or information pertaining to the emergency itself.

Currently, various technology solutions exist for providing emergency-related information to individuals involved in emergency situations. Such solutions include geospatial tracking of individuals, emergency notification systems, and traffic pattern and control systems. These solutions often require individuals using the systems to analyze data and manually communicate emergency-related information through various outlets. Nevertheless, existing solutions often fail in enabling various users of such systems to team up with users of other systems to further analyze resulting data. Furthermore, individuals are often left on their own to try to figure out evacuation routes, which routes are congested, best modes of transportation, and how a particular emergency situation is impacting the affected and surrounding areas.

As a result, there is a need for more efficient and effective systems for providing emergency-related information to emergency personnel and individuals, particularly during a catastrophic event.

SUMMARY OF THE INVENTION

The present invention is directed to systems and methods for providing emergency-related information to emergency personnel and individuals. In particular, individuals can be provided with primary evacuation routes, alternate routes, and preferred modes of transportation to assist the individuals in an emergency situation.

One embodiment of the invention is a computer-based system for providing emergency-related information. The system can include a processor configured to execute computer-readable instructions. The system can also include one or more communications devices utilized by a user, wherein the one or more communications devices is communicatively linked with a provider. Additionally, the system can include a personalized notification route engine (PNRE) configured to execute on the processor and communicatively linked with the provider. The PNRE can be configured to receive geospatial information associated with the one or more communications devices via the provider. Also, the PNRE can be configured to obtain data comprising one or more among evacuation routes, evacuation rules, demographic data, environmental conditions, external alerts, real-time traffic data, and traffic control data. The PNRE can further be configured to determine the emergency-related information based on the geospatial information and the obtained data and transmit the determined emergency-related information to the user via the provider.

Another embodiment of the invention is a computer-based method for providing emergency-related information. The method can include receiving at a first system geospatial information associated with a device utilized by a user, wherein the device is communicatively linked with a provider that is communicatively linked to the first system. The method can also include obtaining data from a second system, wherein the data comprises one or more among evacuation routes, evacuation rules, demographic data, environmental conditions, external alerts, real-time traffic data, and traffic control data. Furthermore, the method can include determining the emergency-related information based on the geospatial information and the data obtained from the second system. Moreover, the method can include transmitting the determined emergency-related information to the user via the provider.

Yet another embodiment of the invention is a computer-readable storage medium that contains computer-readable code, which when loaded on a computer, causes the computer to perform the following steps: receiving at a first system geospatial information associated with a device utilized by a user, wherein the device is communicatively linked with a provider that is communicatively linked to the first system; obtaining data from a second system, wherein the data comprises one or more among evacuation routes, evacuation rules, demographic data, environmental conditions, external alerts, real-time traffic data, and traffic control data; determining emergency-related information based on the geospatial information and the data obtained from the second system; and, transmitting the determined emergency-related information to the user via the provider.

BRIEF DESCRIPTION OF THE DRAWINGS

There are shown in the drawings, embodiments which are presently preferred. It is expressly noted, however, that the invention is not limited to the precise arrangements and instrumentalities shown.

DETAILED DESCRIPTION

Figure 1:
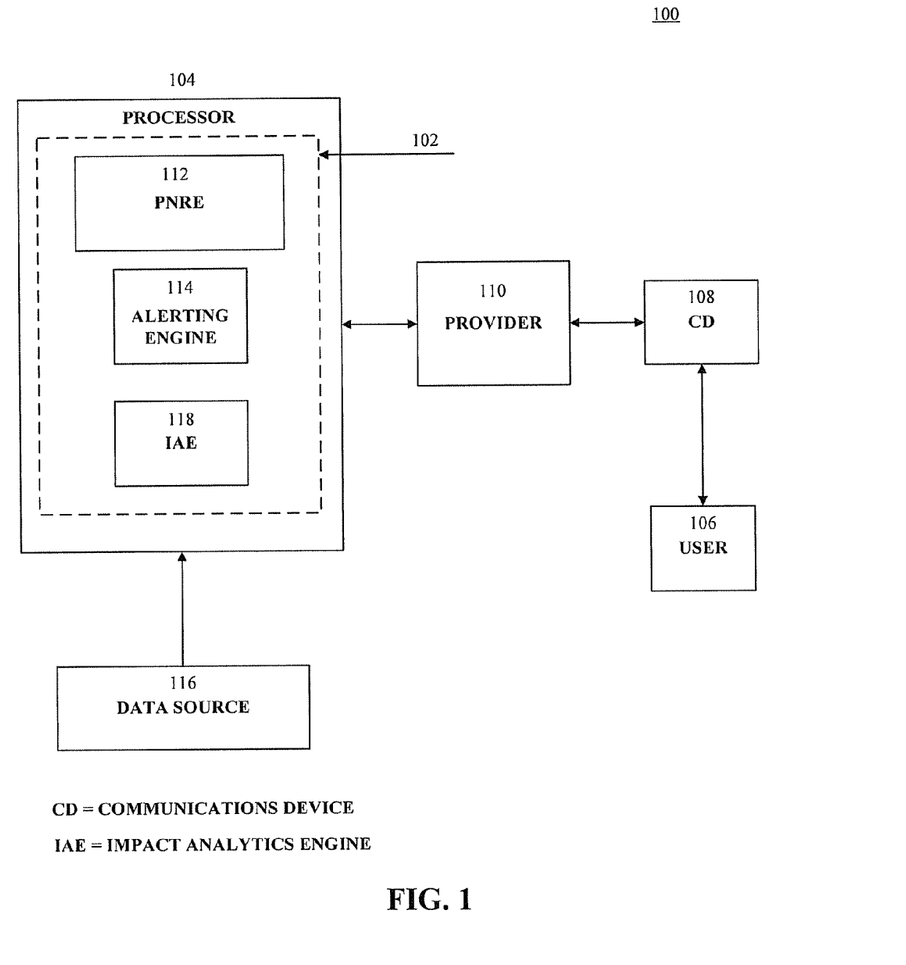
FIG. 1 is a schematic view of an exemplary environment in which is a system for providing emergency-related information, according to one embodiment of the invention.

Referring initially to FIG. 1, a schematic view of an exemplary environment 100, in which a system 102 is utilized for providing emergency-related information, according to one embodiment of the invention, is illustrated. The environment 100 can include a processor 104 configured to execute computer-readable instructions. The environment 100 can also include a user 106, one or more communications devices 108, and a provider 110 communicatively linked with the one or more communications devices 108 and subscribed to by the user 106. The users 106 can be individuals trying to evacuate an emergency area, emergency personnel trying to enter into an emergency area, or any other type of user. Also, the one or more communications devices 108 can comprise one or more of a mobile device, a computing device, and a cellular phone. The provider can be a telecommunications provider, mobile services provider, cellular phone provider, or other similar provider. Additionally, the environment 100 can include a data source 116, which can relay information to the system 102. Although one processor 104, one personalized notification route engine (PNRE) 112, one alerting engine 114, one impact analytics engine (IAE) 118, one user 106, one communications device 108, one provider 110, and one data source 116 are shown, it will be apparent to one of ordinary skill based on the description that a greater number of processors 104, PNREs 112, alerting engines 114, IAEs 118, users 106, communications devices 108, providers 110, and data sources 116 can be utilized.

The system 102 for providing emergency-related information, more particularly, can comprise a PNRE 112, an alerting engine 114, and an IAE 118. The system 102 can be implemented as computer-readable code configured to execute on the processor 104. Alternatively, the system 102 can be implemented in hardwired, dedicated circuitry for performing the operative functions described herein. In yet another embodiment, however, the system 102 can be implemented in a combination of hardwired circuitry and computer-readable code.

Operatively, the system 102 can be utilized to determine and transmit emergency-related information to a user 106 based on the location of the user 106 and data obtained from data sources 116. The emergency-related information can comprise, but is not limited to, one or more among a route, an alert, traffic information, environmental conditions, and a mode of transportation. The route can comprise one or more of a primary route, which can represent an optimal route that the user 106 can take, and an alternate route. Also, the mode of transportation, for example, can specify to the user 106 that the user either walk, run, drive, use an airplane, use a subway, use a train, or use a boat. The one or more communications devices 108 utilizes the provider 110 to communicatively link to the system 102. In order to obtain the emergency-related information, the provider 110 communicates with the PNRE 112, which can also be configured to execute on the processor 104.

The PNRE 112 can be configured to receive geospatial information associated with the one or more communications devices 108 via the provider 110. The location of the user 106 can be determined based on the received geospatial information and can be determined through a variety of means for providing geospatial information. Such means can include, but are not limited to, global positioning systems (GPS), cell phone tower triangulation, internet protocol (IP) tracing, and other geospatial determination methods. The geospatial information can be provided by the provider 110, the one or more communications devices 108, or from elsewhere. Notably, the invention is not limited to communications devices 108 with GPS or geospatial applications.

Also, the PNRE 112 can be configured to obtain data from the data source 116, wherein the data can comprise, but is not limited to, one or more among evacuation routes, evacuation rules, demographic data, environmental conditions, external alerts, real-time traffic data, and traffic control data. The evacuation routes and rules can, for example, contain the appropriate rules and regulations for emergency evacuation, building locations, underground shelters, or other pertinent information for a geographical area. Additionally, the demographic data can include population statistics, work patterns, traffic patterns, and other information. The PNRE 112 can also be configured to obtain external alerts arriving at the system 102. An external alert can be used to inform the system 102 of emergency situations and can come from a national weather center, news media, hurricane trackers, earthquake monitors, and other such information services. For example, a weather center can send a hurricane alert, which can be evaluated by the PNRE 112 so as to aid in the determination of the emergency-related information. Furthermore, the real-time traffic data and traffic control data can include, but are not limited to, real-time traffic information, anticipated traffic control information, street layouts, maps, or Dynamic Visualization System (DVS) capabilities. The environmental conditions can include, but are not limited to, rain, fire, smoke, flooding, hurricanes, destroyed bridges and streets, fallen trees, accidents, congestion, unsafe buildings, and unsafe routes.

The PNRE 112 can be further configured to determine the emergency-related information based on the geospatial information and the data obtained from the data source 116. Notably, the determined emergency-related information can be tailored to the particular user's 106 location and surrounding conditions. Furthermore, the PNRE 112 can be configured to transmit the determined emergency-related information to the one or more communications devices 108 via the provider 110. As an illustration, the system 102 can notify the user 106 that although a particular route seems navigable, that, in fact, it really is not based on the information the PNRE 112 utilized in determining the emergency-related information.

The system 102 can also be adapted to take in an input from the user 106 and factor the input when determining the emergency-related information. For example, if a particular user 106 informs the PNRE 112 that he or she has no vehicle, the PNRE 112 can factor the input in its determinations. In one embodiment, the user 106 in an emergency or non-emergency situation can utilize the one or more communications devices 108 to request emergency-related information to assist the user 106. The request can be sent to the provider 110 and then to the alerting engine 114, which is communicatively linked to the provider 110 and the PNRE 112. From here, the alerting engine 114, which can be configured to execute on the processor 104, can notify the PNRE 112 to determine the emergency-related information and the PNRE 112 can then transmit the determined emergency-related information back to the user via the alerting engine 114 and the provider 110. The alerting engine 114 can also be configured to convey one or more of a broadcast emergency message and a specific message containing the emergency-related information based on one or more of the geospatial information, the obtained data, and the external alerts obtained by the system 102. In other words, a general broadcast may be sent out to all subscribers in an area, but only some may receive specific evacuation information. For example, during a hurricane, some users 106 may only need to put up shutters based on their location, whereas other users 106 may need to evacuate and would need specific emergency-related information. Notably, there can be multiple alerting engines 114 based on provider subscriptions or configurations. Each provider 110 might have their own alerting engine 114 or can subscribe to a central alerting engine 114.

In a particular embodiment of the system 102, the alerting engine 114 can be configured to receive a request to update the emergency-related information based on a frequency specified by the user 106 and to notify the PNRE 112 of the request. The PNRE 104 can be configured to update the emergency-related information and transmit the updated emergency-related information to the one or more communications devices 108 via the alerting engine 114 and the provider 110. For example, the user 106 can specify that the user 106 would like to receive updates every two minutes from the alerting engine 114. The updates can include re-determining and transmitting the emergency-related information as data is obtained. In another embodiment, the processor 104 can be configured to transmit the emergency-related information to the user 106 in real-time.

In another embodiment, if the user 106 is receiving alerts, the alert can comprise providing instructions to the user 106 to evacuate to a safe zone without interfering with an emergency personnel. In yet another embodiment, the PNRE 112 can be configured to load balance traffic based on the obtained data. The load balancing can be utilized to minimize congestion on any routes determined by the PNRE 112. When load balancing the traffic, routes can be priority-based depending on the user 106. For example, if the PNRE 112 has obtained data from the data source 116, and the data shows a lot of traffic on a particular route, the PNRE 112 can determine primary and alternate routes and transmit the routes to users 106 in such a way so as to balance the traffic on the determined routes. Also, if emergency personnel are trying to get into an emergency region, emergency personnel can be given priority over other users 106 by load balancing routes in such a way so as to allow the emergency personnel to enter the region on routes with minimal congestion.

According to one embodiment, the system 102 can utilize the IAE 118, which can be configured to execute on the processor 104 and can be communicatively linked to the PNRE 112. The IAE 118 can be configured to determine an impact of the determined emergency-related information based on one or more of an external alert, additional data, a quantity of requests received, a quantity of the routes determined, and a frequency of the routes transmitted to the user 106. For example, the IAE 118 can determine the traffic impact of routes being produced by the PNRE 112. In another embodiment, the IAE 118 can be configured to provide guidance on the emergency-related information to the user 106 based on the determined impact. For example, the IAE 118 can be utilized to inform the user 106 regarding the usage of various routes.

Figure 2:
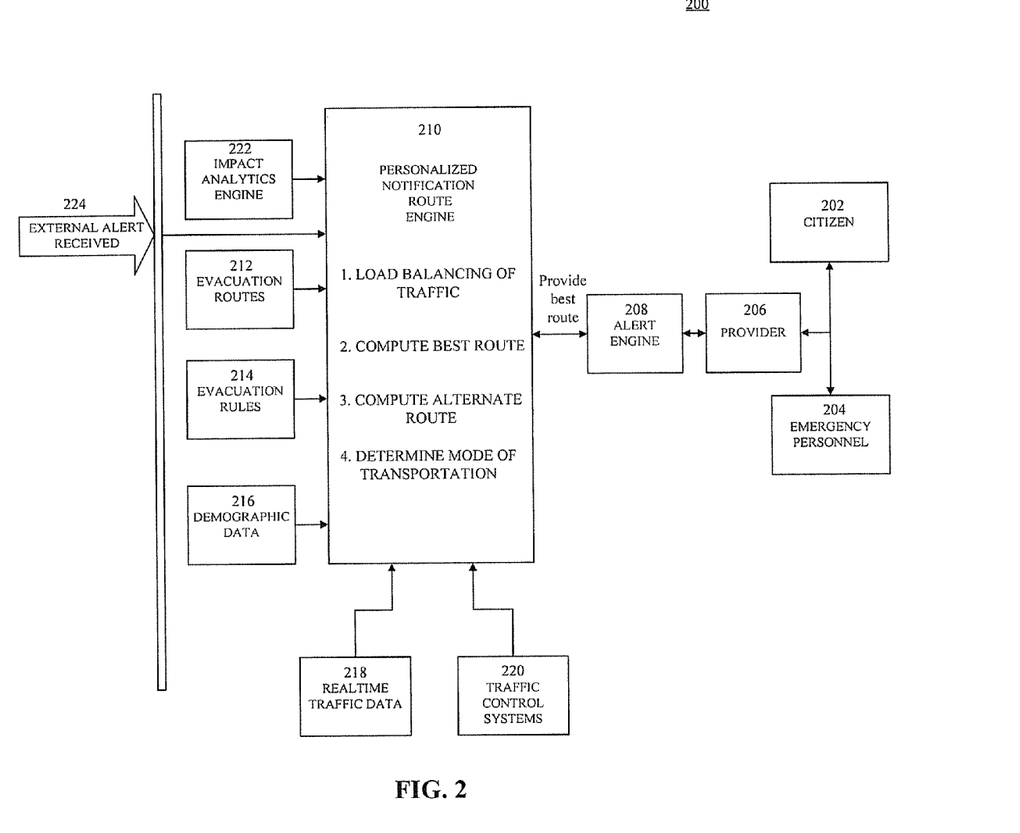
FIG. 2 is a schematic diagram illustrating the basic components of a system for providing emergency-related information, according to an embodiment of the invention.

Referring now also to FIG. 2, a schematic diagram illustrating the basic components of a system 200 for providing emergency-related information is provided. The system 200 can include citizens 202 and emergency personnel 204, who utilize a communications device (not explicitly shown) associated with a provider 206. For example, the citizens 202 can use the system 200 to find a route to get out of a disaster area and the emergency personnel 204 can use the system 200 to find a safe route into the disaster area. The communications device can utilize the provider 206 to connect to an alerting engine 208 so as to obtain emergency-related information, such as a best route for evacuation. The alerting engine 208 is communicatively linked with a personalized notification route engine (PNRE) 210, which utilizes evacuation routes 212, evacuation rules 214, demographic data 216, real-time traffic data 218, geospatial information, and traffic control systems 220 to determine the emergency-related information. The PNRE 210 can perform load balancing of traffic, determine a best route and alternate route, and determine a mode of transportation. The system 200 can also include an impact analytics engine, which can determine the impact of routes determined based on an external alert 224, additional data, a quantity of requests received, a quantity of the routes determined, and a frequency of the routes produced.

In one embodiment, the processor 104 can be configured to determine and transmit another route to the user of the route the user selects is congested. The processor 104 can be configured to determine an emergency region based on one or more of the external alert and the geospatial information and determine if the user is in the emergency region based on the geospatial information. The emergency region can be based on external alerts received from outside sources and can also be based on the geospatial information received for the users 106 belonging to the provider 110. For example, the emergency region can be a disaster zone as specified by an emergency center providing an external alert. Such information from the emergency center and the geospatial information for the users 106 can be used to determine if the users 106 are in the emergency region. The emergency-related information can be tailored to each user 106 and the emergency-related information can be transmitted to the provider 110. In the event of an emergency, the provider 110 can transmit the determined emergency-related information as an emergency broadcast to the one or more communications devices 108 within the emergency region. The system 102 can track the traffic flow and the amount of time it would take for a particular user to be able to proceed on a congested route and adjust routes and the emergency-related information. In another embodiment, the obtaining of the data, the determining of the emergency-related information, and the transmitting of the emergency-related information are only performed if the user 106 is determined to be in the emergency region.

Figure 3:
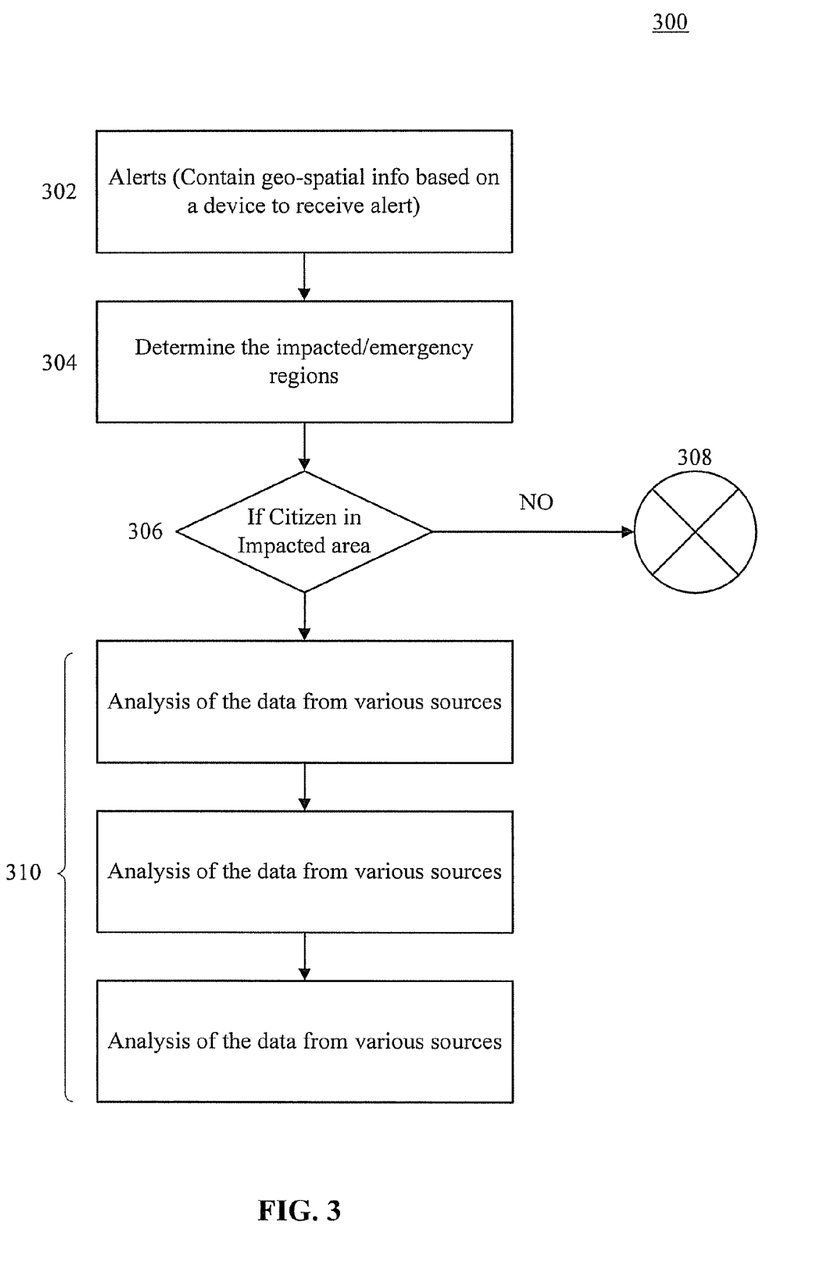
FIG. 3. is a flowchart depicting the flow through the system in one embodiment of the invention.

Referring now also to FIG. 3 a flowchart depicting the flow through a system 300, in one embodiment of the invention, is illustrated. The flowchart can include sending out alerts/requests 302 of a user, along with geospatial information associated with a device used by the user, for emergency-related information. After sending out the alerts 302, the system 300 can determine the impacted/emergency regions and determine if the user is in the impacted area. If not, the system 300 can cease its operations 308. However, if the citizen is in the impacted area, then the system 300 can utilize analyses of data from various data sources 310 to determine and relay emergency-related information back to the user.

According to another embodiment, an application can be integrated with the PNRE 112 by utilizing an integration technology. For example, an application can be integrated by hard-coding point-to-point, using Enterprise Service Bus (ESB) technology, using message queuing (MQ), and by using middleware. Applications are not limited to being integrated with the PNRE 112 by the above methods. In still another embodiment, the PNRE 112 can be integrated with the provider 110 by utilizing a broker. For example, the integration can be performed by utilizing an ESB broker or other brokers.

Figure 4:
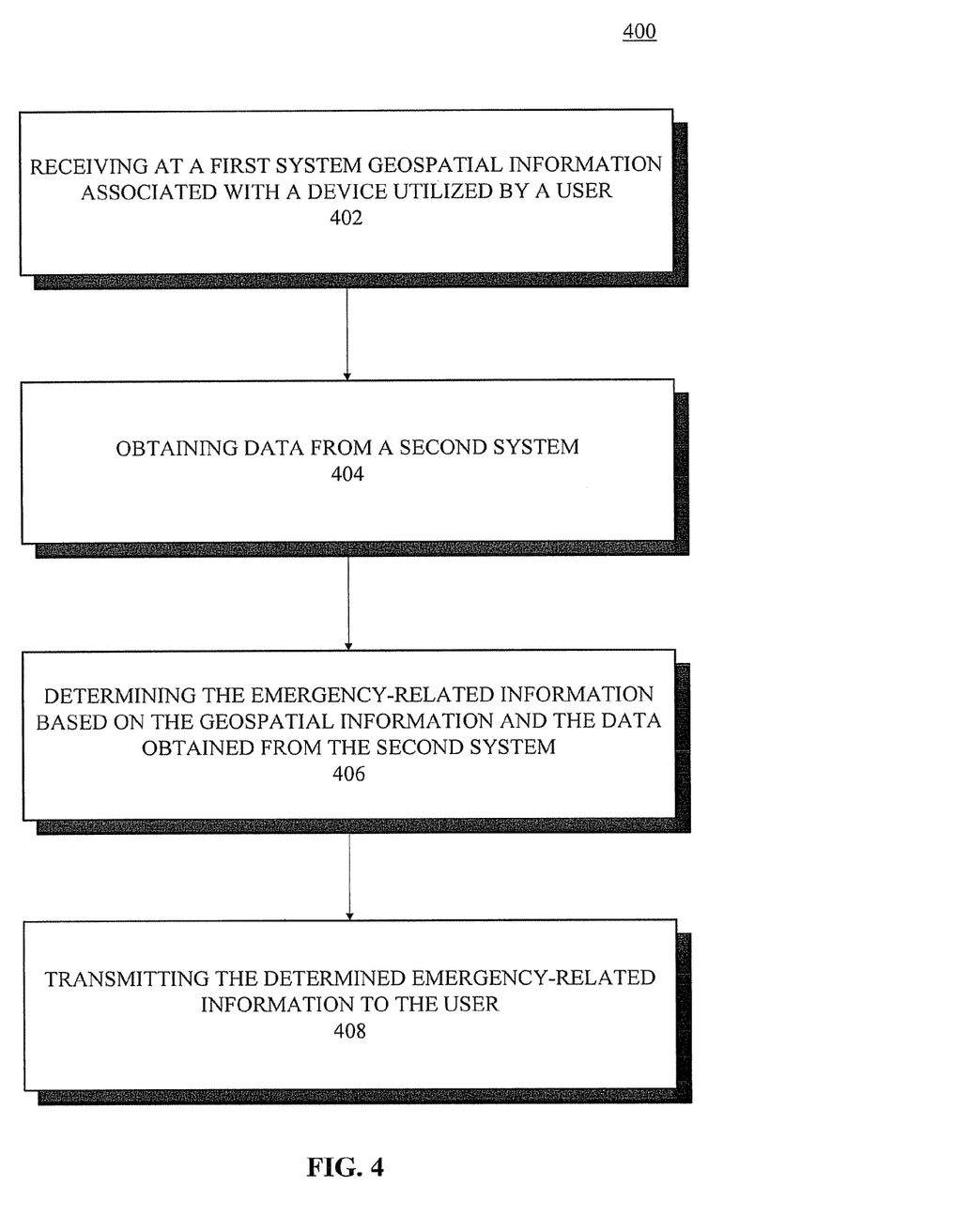
FIG. 4 is a flowchart of steps in a method for providing emergency-related information, according to another embodiment of the invention.

Referring now to FIG. 4, a flowchart is provided that illustrates certain method aspects of the invention. The flowchart depicts steps of a method 400 for providing emergency-related information. The method 400 illustratively includes, at the start step 402, receiving at a first system geospatial information associated with a device utilized by a user, wherein the device is communicatively linked with a provider that is communicatively linked to the first system. The location of the user can be determined by the geospatial information received at the first system. The method 400 also includes obtaining data from a second system, wherein the data comprises at least one among evacuation routes, evacuation rules, demographic data, environmental conditions, external alerts, real-time traffic data, and traffic control data at step 404. At step 406, the method 400 can include determining the emergency-related information based on the geospatial information and the data obtained from the second system. At the ending step 408, the method can further include transmitting the determined emergency-related information to the user via the provider. The obtaining, determining, and transmitting steps can be performed by the first system, which can include a processor and accompanying hardware and software. It is important to note that one or more of steps in the method 400 can be performed by utilizing various forms of devices. Notably, the device can comprise one or more of a mobile communications device, a computing device, and a cellular phone.

According to a particular embodiment, the method 400 can include enabling the user to request the emergency-related information by utilizing the device to send a request to the first system via the provider. In another embodiment, the method 400 can include updating the emergency-related information based on a frequency specified by the user. In another embodiment, the method 400 can include transmitting the emergency-related information to the user in real-time. Also, the emergency-related information can comprise one or more among a route, an alert, traffic information, environmental conditions, and a mode of transportation, wherein the route comprises one or more of a primary route and an alternate route. In an embodiment, the alert can comprise providing instructions to the user to evacuate to a safe zone without interfering with an emergency personnel.

In another embodiment, the method 400 can comprise load balancing traffic based on the obtained data, wherein the load balancing is utilized to minimize congestion on the determined routes. In yet another embodiment, the method 400 can comprise determining an impact of the determined emergency-related information based on one or more of an external alert, additional data from the second system, a quantity of requests received, a quantity of routes determined, and a frequency of the routes transmitted to the user. The method 400 can further include providing guidance on the emergency-related information based on the determined impact.

In a particular embodiment, the method 400 can comprise determining and transmitting another route to the user if the route the user selects is congested. In another embodiment, the method 400 can comprise determining an emergency region based on one or more of the external alert and the received geospatial information and determining if the user is in the emergency region based on the geospatial information. In still another embodiment, the obtaining of the data, determining of the emergency-related information, and transmitting of the emergency-related information are only performed if the user is determined to be in the emergency region.

According to another embodiment, the method 400 can include integrating an application with the first system by utilizing an integration technology. For example, an application can be integrated by hard-coding point-to-point and by using Enterprise Service Bus (ESB) technology, message queuing (MQ), and other forms of middleware. Applications are not limited to being integrated with the PNRE 112 by using the above methods. In still another embodiment, the first system can be integrated with the provider by utilizing a broker. For example, the integration can be performed by utilizing an ESB broker or other brokers.

The invention, as already mentioned, can be realized in hardware, software, or a combination of hardware and software. The invention can be realized in a centralized fashion in one computer system, or in a distributed fashion where different elements are spread across several interconnected computer systems. Any type of computer system or other apparatus adapted for carrying out the methods described herein is appropriate. A typical combination of hardware and software can be a general purpose computer system with a computer program that, when being loaded and executed, controls the computer system such that it carries out the methods described herein.

The invention, as already mentioned, can be embedded in a computer program product, such as magnetic tape, an optically readable disk, or other computer-readable medium for storing electronic data. The computer program product can comprise computer-readable code, defining a computer program, which when loaded in a computer or computer system causes the computer or computer system to carry out the different methods described herein. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The preceding description of preferred embodiments of the invention have been presented for the purposes of illustration. The description provided is not intended to limit the invention to the particular forms disclosed or described. Modifications and variations will be readily apparent from the preceding description. As a result, it is intended that the scope of the invention not be limited by the detailed description provided herein.

We claim:

1. A computer-based method for providing emergency-related information, the method comprising:
   receiving, from a provider, geospatial information associated with a device utilized by a user;
   receiving, from the device, an input at the device from the user, wherein the device is communicatively linked with the provider, wherein the input comprises an indication of whether the user is currently travelling in a vehicle being guided by the user;
   obtaining data from a data source, wherein the data comprises at least one among evacuation routes, evacuation rules, demographic data, environmental conditions, external alerts, real-time traffic data, and traffic control data;
   determining the emergency-related information based on the geospatial information, the input from the user, and the data obtained from the second system;
   transmitting the determined emergency-related information to the device for the user via the provider; and
   determining an impact of the determined emergency-related information based on external alerts, additional data from the data source, and additional user data, the additional user data comprising at least one of a quantity of requests received from the user, a quantity of routes determined for the user, and a frequency of transmitting the routes to the user.

2. The method of claim 1, further comprising enabling the user to request the emergency-related information by utilizing the device to send a request via the provider.

3. The method of claim 1, further comprising updating the emergency-related information based on a frequency specified by the user at the device.

4. The method of claim 1, wherein the emergency-related information is transmitted to the device in real-time.

5. The method of claim 1, wherein the device comprises at least one of a mobile communications device, a computing device, and a cellular phone.

6. The method of claim 1, wherein the emergency-related information comprises at least one among a route, an alert, traffic information, environmental conditions, and a mode of transportation, wherein the route comprises at least one of a primary route and an alternate route.

7. The method of claim 6, wherein the alert comprises providing instructions for the user to evacuate to a safe zone without interfering with emergency personnel.

8. The method of claim 6, further comprising load balancing traffic based on the obtained data, wherein the load balancing is utilized to minimize congestion on the determined routes.

9. The method of claim 1, further comprising providing guidance on the emergency-related information based on the determined impact.

10. The method of claim 6, further comprising:
determining a current route selected by a user based at least on the geospatial information;
determining and transmitting another route to the device for the user if the current route is congested.

11. The method of claim 1, further comprising:
determining an emergency region based on at least one of the external alerts and the geospatial information; and
determining if the user is in the emergency region based on the geospatial information.

12. The method of claim 11, wherein the obtaining of the data, determining of the emergency-related information, and transmitting of the emergency-related information are only performed if the user is determined to be in the emergency region.

13. The method of claim 1, wherein the receiving and transmitting is performed via a broker.

14. A computer-based system for providing emergency-related information, the system comprising:
a processor configured to execute computer-readable instructions;
a personalized notification route engine (PNRE) configured to execute on the processor and communicatively linked with a provider communicatively linked to a device utilized by a user, wherein the PNRE is configured to cause the processor to:
receive geospatial information associated with the device from the provider;
receive an input at the device from the user, the input comprising an indication of whether the user is currently travelling in a vehicle being guided by the user;
obtain data from a data source comprising at least one among evacuation routes, evacuation rules, demographic data, environmental conditions, external alerts, real-time traffic data, and traffic control data;
determine the emergency-related information based on the geospatial information, the input from the user, and the obtained data; and
transmit the determined emergency-related information to the device via the provider;
an impact analytics engine (IAE) configured to execute on the processor and communicatively linked to the PNRE, wherein the IAE is configured to cause the processor to determine an impact of the determined emergency-related information based on external alerts, additional data from the data source, and additional user data, the additional user data comprising at least one of a quantity of requests received from the user, a quantity of routes determined for the user, and a frequency of transmitting the routes to the user.

15. The system of claim 14, further comprising an alerting engine configured to execute on the processor, wherein the alerting engine is communicatively linked to the PNRE and the device via the provider.

16. The system of claim 15, wherein the alerting engine is configured to convey at least one of a broadcast emergency message and a specific message containing the emergency-related information based on at least one of the geospatial information, the obtained data, and the external alerts.

17. The system of claim 15, wherein the alerting engine is configured to receive a request from the user at the device for the emergency-related information via the provider and notify the PNRE to determine the emergency-related information.

18. The system of claim 15, wherein the alerting engine is configured to receive a request to update the emergency-related information based on a frequency specified by the user at the device and notify the PNRE, and wherein the PNRE is configured to cause the processor to update the emergency-related information and transmit the updated emergency-related information at the frequency specified to the device via the alerting engine and the provider.

19. The system of claim 14, wherein the processor is configured to transmit the emergency-related information to the device in real-time.

20. The system of claim 14, wherein the device comprises at least one of a mobile device, a computing device, and a cellular phone.

21. The system of claim 14, wherein the emergency-related information comprises at least one among a route, an alert, traffic information, environmental conditions, and a mode of transportation, wherein the route comprises at least one of a primary route and an alternate route.

22. The system of claim 21, wherein the alert comprises providing instructions at the device for the user to evacuate to a safe zone without interfering with emergency personnel.

23. The system of claim 21, wherein the PNRE is configured to load balance traffic based on the obtained data, wherein the load balancing is utilized to minimize congestion on the determined routes.

24. The system of claim 14, wherein the IAE is configured to cause the processor to provide guidance on the emergency-related information to the device for the user based on the determined impact.

25. The system of claim 21, wherein the processor is configured to determine a current route selected by a user based at least on the geospatial information and determine and transmit another route to the device for the user if the current route is congested.

26. The system of claim 14, wherein the processor is configured to determine an emergency region based on at least one of the external alert and the geospatial information and determine if the user is in the emergency region based on the geospatial information.

27. The system of claim 26, wherein the obtaining of the data, determining of the emergency-related information, and transmitting the emergency-related information are only performed if the user is determined to be in the emergency region.

28. The system of claim 14, further comprising integrating an application with the PNRE by utilizing an integration technology.

29. The system of claim 28, further comprising integrating the provider with the PNRE by utilizing a broker.

30. A non-transitory computer-readable storage medium having stored therein computer-readable instructions, which, when loaded in and executed by a computer causes the computer to perform the steps of:
- receiving from a provider geospatial information associated with a device utilized by a user;
- receiving an input at the device from the user, wherein the device is communicatively linked with the provider, wherein the input comprises an indication of whether the user is currently travelling in a vehicle being guided by the user;
- obtaining data from a data source, wherein the data comprises at least one among evacuation routes, evacuation rules, demographic data, environmental conditions, external alerts, real-time traffic data, and traffic control data;
- determining emergency-related information based on the geospatial information, the input from the user, and the data obtained from the second system;
- transmitting the determined emergency-related information to the device for the user via the provider; and
- determining an impact of the determined emergency-related information based on external alerts, additional data from the data source, and additional user data, the additional user data comprising at least one of a quantity of requests received from the user, a quantity of routes determined for the user, and a frequency of transmitting the routes to the user.

31. The non-transitory computer-readable storage medium of claim 30, further comprising computer-readable code for causing the computer to enable the user to request the emergency-related information by utilizing the device to send a request via the provider.

32. The non-transitory computer-readable storage medium of claim 30, further comprising computer-readable code for causing the computer to update the emergency-related information based on a frequency specified by the user at the device.

33. The non-transitory computer-readable storage medium of claim 30, wherein the emergency-related information is transmitted to the device in real-time.

34. The non-transitory computer-readable storage medium of claim 30, wherein the device comprises at least one of a mobile communications device, a computing device, and a cellular phone.

35. The non-transitory computer-readable storage medium of claim 30, wherein the emergency-related information comprises at least one among a route, an alert, traffic information, environmental conditions, and a mode of transportation, wherein the route comprises at least one of a primary route and an alternate route.

36. The non-transitory computer-readable storage medium of claim 35, wherein the alert comprises providing instructions for the user to evacuate to a safe zone without interfering with emergency personnel.

37. The non-transitory computer-readable storage medium of claim 35, further comprising computer-readable code for causing the computer to load balance traffic based on the obtained data wherein the load balancing is utilized to minimize congestion on the determined routes.

38. The non-transitory computer-readable storage medium of claim 30, further comprising computer-readable code for causing the computer to provide guidance on the emergency-related information to the user based on the determined impact.

39. The non-transitory computer-readable storage medium of claim 35, further comprising computer-readable code for causing the computer to determine and transmit another route to the user if the route the user selects is congested.

40. The non-transitory computer-readable storage medium of claim 30, further comprising computer-readable code for causing the computer to determine an emergency region based on at least one of the external alert and the geospatial information and determining if the user is in the emergency region based on the geospatial information.

41. The non-transitory computer-readable storage medium of claim 40, wherein the obtaining of the data, determining of the emergency-related information, and transmitting of the emergency-related information are only performed if the user is determined to be in the emergency region.

42. The non-transitory computer-readable storage medium of claim 30, wherein the receiving and transmitting is performed via a broker.

* * * * *